June 2, 1970  J. A. GIARDINA  3,514,927
CANE CUTTING LEVEL CONTROL DEVICE
Filed Oct. 7, 1968  3 Sheets-Sheet 1

INVENTOR
JACOB A. GIARDINA

BY
ATTORNEYS

INVENTOR
JACOB A. GIARDINA

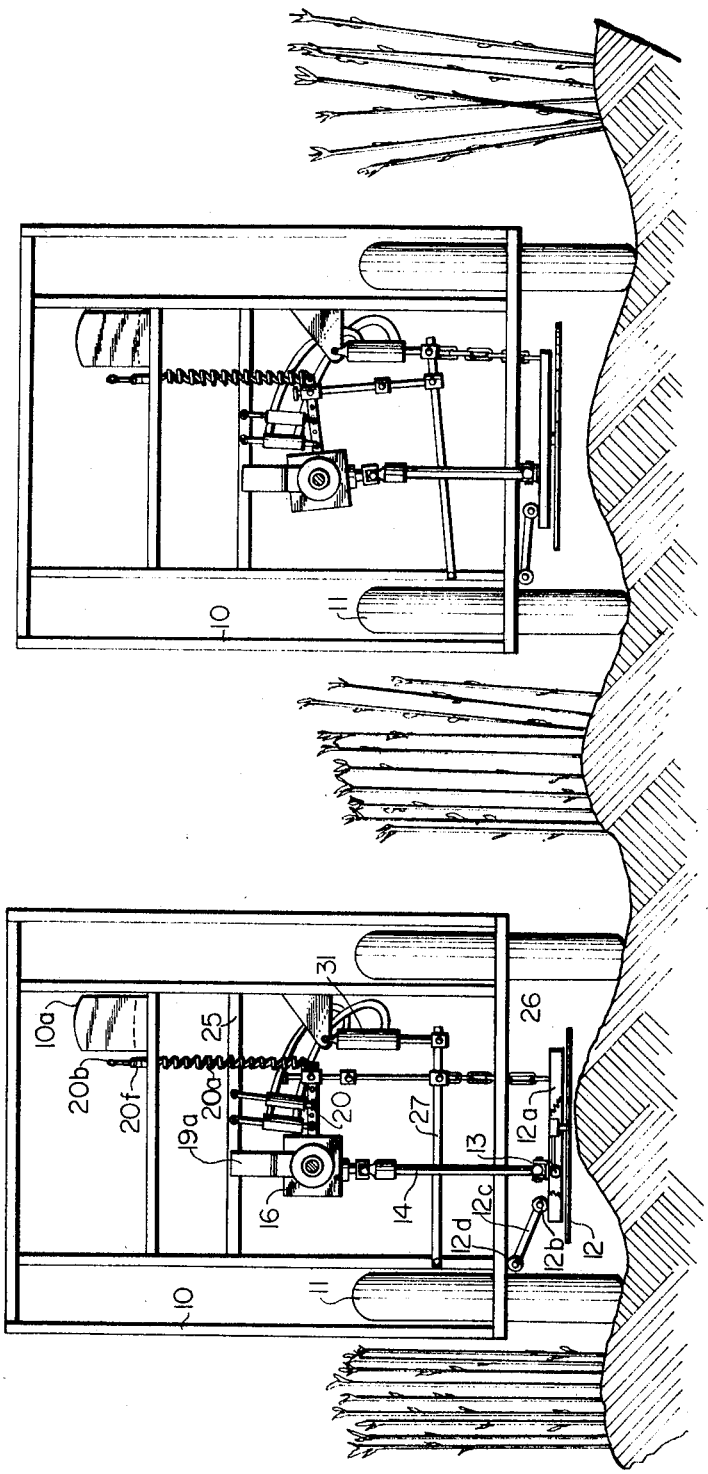

United States Patent Office 3,514,927
Patented June 2, 1970

3,514,927
CANE CUTTING LEVEL CONTROL DEVICE
Jacob A. Giardina, Kenner, La., assignor to Cane Machinery & Engineering Company, Inc., Thibodaux, La., a corporation of Louisiana
Filed Oct. 7, 1968, Ser. No. 765,284
Int. Cl. A01d 45/10
U.S. Cl. 56—16                                                 5 Claims

ABSTRACT OF THE DISCLOSURE

The instant disclosure relates to a device for raising and lowering a sugar cane cutter carried by a harvester or other mobile frame movable through a cane field which engages sugar cane stalks to be cut a predetermined level above the earth and which device will regulate the raising and lowering of the cane cutter incident to the cutter blade engaging earth or foreign matter other than sugar cane stalks which will cause a counter torque to be generated in a gear box drive which drives the sugar cane cutter in such a way that the box being pivoted to rotate about its horizontal axis and having a signal arm extending therefrom will raise and lower the arm about the pivotal axis of the gear box. The sugar cane cutting blade assembly is raised and lowered by a hydraulic cylinder and ram one end of the cylinder being connected to the mobile frame of the harvester or mobile frame and the other being connected to raise and lower the cane cutter blade assembly. Secured between the mobile frame and the signal arm is a servo-cylinder and ram which will regulate the fluid flow to the raising and lowering cylinder of the cane cutter. When the blade of the cutter engages the earth and a torque greater than the torque necessary to cut a cane stalk is generated, the resultant force will cause the gear box to rotate about its horizontal axis and raise the signal arm causing the servo-cylinder to immediately change the fluid flow to the cane cutter raising and lowering cylinder which will instantly raise or lower the blade dependent upon the amount of torque generated by the blade engaging the object, such as the earth or rocks or any foreign material encountered in a sugar cane field.

An object of the present invention is the provision of an automatic control for raising and lowering the rotary cutter blade of a sugar cane harvester or stubble trimmer or the like incident to the cutter blade engaging an object of greater resistance than the normal resistance the blade will encounter when engaging a sugar cane stalk. Should the cutter blade engage the earth, a greater resistance will be encountered, and a counter torque will be generated in the blade drive mechanism. The blade drive mechanism through universal joints goes through a gear box being mounted about its horizontal axis pivotally to the harvester frame or mobile frame moving the cutter blade through the cane field. The amount of rotary motion imparted in degrees of shift of the gear box about its horizontal axis is communicated through a rigid arm secured to the gear box which will control a servo-mechanism for controlling the rate of fluid flow to the cane cutter raising and lowering cylinder thereby instantly causing the blade to be raised clear of the obstruction and to be returned to a normal cutting attitude.

Another object of this invention is the provision of an automatic sugar cane cutting blade retracting mechanism which upon the blade engaging an object will cause immediate retraction of the blade away from the object thereby prohibiting the placement of undue stress and forces on the cutter blade drive mechanism as well as destruction of the blade.

With the foregoing and other objects in view, the invention will be more fully described hereinafter, and will be more particularly pointed out in the claims appended hereto.

In the drawing, wherein like symbols refer to like corresponding parts throughout the several views:

FIGS. 4 and 5 are a transverse section taken through the harvester at the point of installation of the cane cutting level control device showing the sugar cane cutting blade in the lowered cutting position in FIG. 4 and in the retracted elevated condition in FIG. 5.

Figures 1, 6:
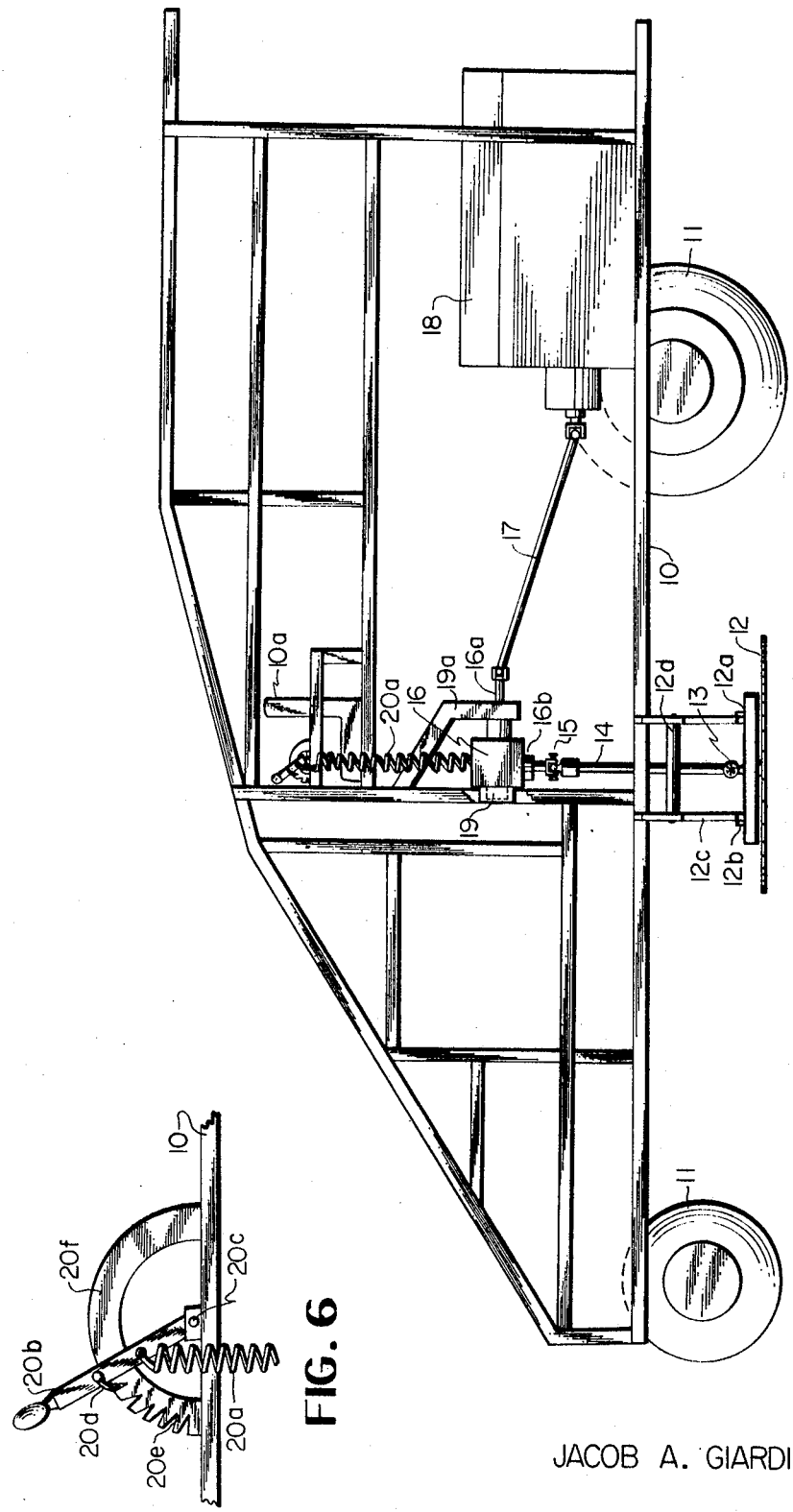
FIG. 1 is a side elevational view of a sugar cane harvester having the cane cutting level control device of the instant invention installed thereon.
FIG. 6 is a fragmentary side elevational view of the sensitivity adjustment regulating device.
Figure 2:
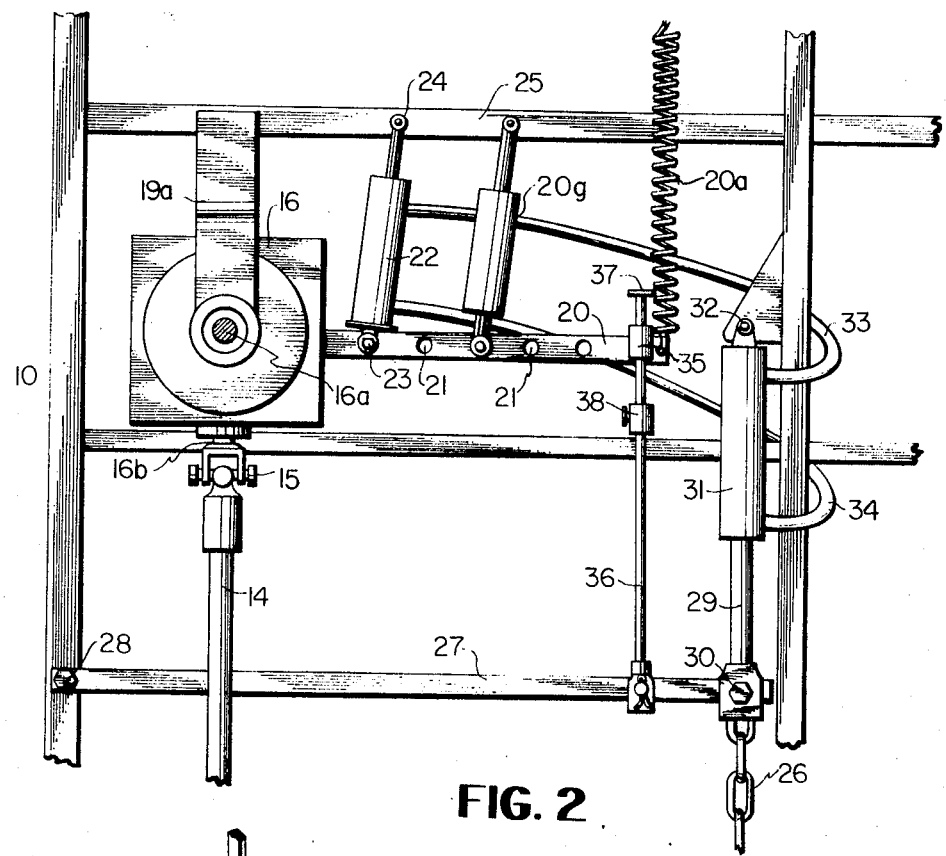
FIG. 2 is an end elevational view of the cane cutting level control device of the present invention installed on the harvester of FIG. 1 and shown at a magnified scale.
Figure 3:
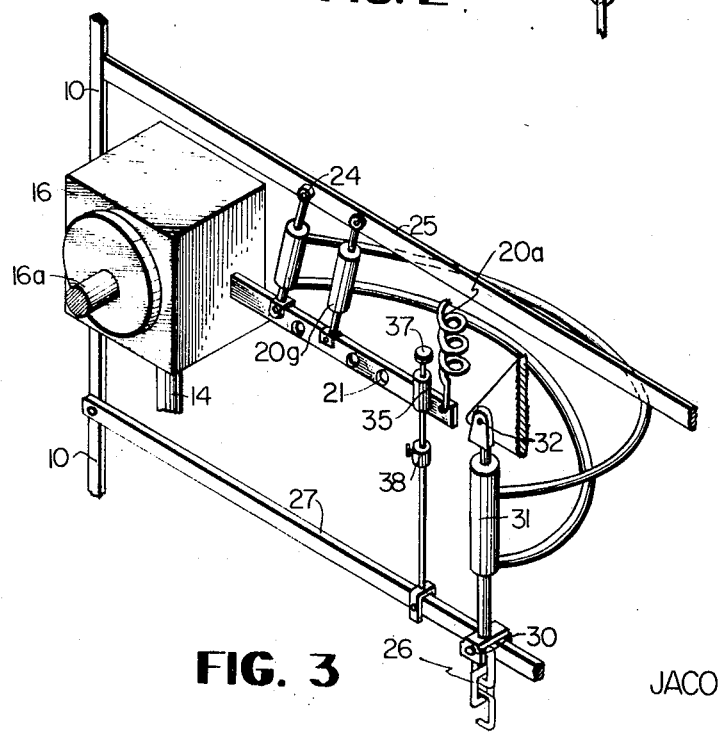
FIG. 3 is a perspective view of the mechanism of FIG. 2.

Referring now to the drawings and for the moment to FIG. 1, 10 designates a mobile frame in the instant application a sugar cane harvester mounted on wheels 11 for passage through a sugar cane field. A rotary type sugar cane cutting blade 12 is connected through universals 13 to a drive 14 through universals 15 through a right-angled gear box 16 and thence through a power shaft 17 to a prime mover in the form of either a gasoline or diesel engine 18 carried by the frame. The drive shaft 17 may be either a power take-off shaft or a drive shaft. The gear box 16 is mounted for pivotal movement to the mobile frame at 19 and 19A so that the gear box 16 may rotate as shown in FIGS. 4 and 5 about its horizontal drive input axis.

Signal means in the form of an arm 20 is secured to the side of the gear box 16 as by welding or other rigid attachment. The arm 20 has openings 21 therealong to permit the servo-control means in the form of a pilot cylinder 22 to be selectively connected along the arm 20 to control the degree of response desired in the device. The servo-cylinder 22 is connected at one end 23 to the arm 20 and at the other end at 24 to a cross member 25 of the mobile frame.

The rotary sugar cane cutter blade 12 is raised and lowered through a chain 26 which is connected to a bar 27, pivoted at one end 28 to the mobile frame and at the other end to a ram 29 at 30 of a cutter blade raising and lowering cylinder 31.

The upper end of the cylinder 31 is secured to the mobile frame 10 at 32. This is a pivotal connection as is the connection 30. The servo-cylinder 22 has hydraulic lines 33 and 34 to place the servo-cylinder 22 in hydraulic communication with the main sugar cane blade lifting and lowering cylinder 31. Suitable lines are provided to connect the servo-control 22 with the source of hydraulic fluid from the mobile frame's hydraulic system. When the sugar cane cutter blade 12 of FIG. 1 encounters earth or an object of greater resistance than the stalk of sugar cane, a counter torque is generated in the gear box 16 which causes it to rotate about its horizontal axis, for example from the position of FIG. 4 to the position of FIG. 5. This causes the signal arm to vary the cylinder positioning in the servo-control cylinder 22 and to thereby control the hydraulic fluid flow through lines 33 and 34 to the cane cutter raising and lowering cylinder 31. The arm 20 has a collar 35 secured thereto through which is slidably received a rod 36 which acts as a limiting control for the amount of displacement relative between the arm 20 and the pivoted lower arm 27. The rod 36 has a cap 37 of sufficient diameter not to pass through the collar 35 and has a limiting collar 38 secured at a predetermined point along the rod 36 to determine the amount of relative throw between the arm 20 and the arm 27.

In operation when the harvester or mobile frame is moved through the cane field and the rotary blade 12 is connected to be driven by the gasoline or diesel engine 18, the blade rotates and will cut sugar cane stalks which it comes into engagement with. Should the harvester incident to the topography of the field cause the blade to dip into the earth and cut lower than it should cut the sugar cane stalk, a counter torque is generated in the horizontally pivoted gear box 16 causing the arm 20 to pivot about the shaft 16a which is the power input shaft of the gear box 16. When the arm 20 raises the servo-control means 22 signals the main cutter blade lift cylinder 31 to elevate the cutter blade 12 as necessary to avoid destruction of either the object being cut into or the blade itself and also serious overloading of the prime mover.

The rotary cane cutter blade 12 has an assembly 12a which is pivotally connected at 12b through an arm 12c to the harvester frame or mobile frame at 12d.

The force which tends to restore arm 20 to a neutral position and which tends to raise the free end of arm 20 comes from a long spring 20A, one end of which is secured to the free end of arm 20 and the other end of which is secured to a control lever 20B pivoted at 20C to a portion of the main machine frame adjacent the mobile frame operator's seat 10A. The lever 20B has a pivoted pawl 20D which seats in ratchet teeth 20E of a quadrant plate 20F.

A shock absorber 20G is connected at one end to the static frame 25 and at its other end to arm 20. This unit damps out hunting or variations between the counter torque and the spring to keep the servo unit 22 from overdriving the main lift cylinder 31.

There is a substantial variation in the counter torque generated in the pivoted gear box 16 when cutting cane in a dry hard compacted field and moving into a wet cane square where the compaction factor is much lower. The harvester operator may regulate the raising and lowering sensitivity of the cutter blade 12 by tensioning or relaxing spring 20A with proper positioning of handle 20B.

What is claimed is:

1. A cane cutting level control device for use with a cane cutter, a mobile frame and a power take-off of an engine comprising
    (a) a right angle gear box having a power shaft adapted to be connected to the power take-off of the engine and a drive shaft adapted to be connected to drive the cane cutter
    (b) means mounting said gear box on said mobile frame for tilting only about its horizontal axis
    (c) signal means secured to one side of said gear box and movable therewith up and down about the horizontal axis of said box
    (d) cane cutter raising and lowering means one end of which is connected to the mobile frame and the other end of which is connected to raise and lower the cane cutter, and
    (e) servo-control means one end of which is connected to the mobile frame and the other end of which is connected to said signal means, said servo-control means being in circuit to actuate said cane cutter raising and lowering means incident to up and down movement of said signal means when said gear box rotates about its horizontal axis incident to counter torque generated in the gear box when the cane cutter engages an object other than sugar cane.

2. A cane cutting level control device as claimed in claim 1 wherein said signal means is an arm having openings along its length, one end of said arm being connected rigidly to one side of said gear box.

3. A cane cutting level control device as claimed in claim 1 wherein said cane cutter raising and lowering means is a hydraulic cylinder and ram in fluid circuit with the harvester hydraulic system.

4. A cane cutting level control device as claimed in claim 1 wherein said servo-control means is a hydraulic cylinder and valve in fluid circuit with the cane cutter raising and lowering means to regulate the fluid flow thereto proportional to the counter torque generated in the gear box and the resultant displacement of its attached signal means to cause a raising and lowering action of the cane cutter directly proportional to the counter torque generated when the cane cutter strikes an object other than sugar cane.

5. A cane cutting level control device as claimed in claim 1 further comprising limiting means regulatably connected between said signal means and said cane cutter to regulate the amount of lift of said cutter.

References Cited
UNITED STATES PATENTS

| | | | |
|---|---|---|---|
| 2,476,910 | 7/1949 | Read | 56—121.4 |
| 2,510,242 | 6/1950 | Minns et al. | 56—121.4 |
| 2,641,892 | 6/1953 | Hojio | 56—121.46 |
| 3,088,264 | 5/1963 | Sallee | 56—121.4 |
| 3,103,091 | 9/1963 | Duncan et al. | 56—16 |

ANTONIO F. GUIDA, Primary Examiner

U.S. Cl. X.R.

56—121.4